Patented June 12, 1945

2,378,168

UNITED STATES PATENT OFFICE 2,378,168

PROCESS FOR PREPARING 2,6-DINITRO-4-SULPHO-TOLUENE

Michael Witte, Buffalo, N. Y., assignor to Allied Chemical & Dye Corporation, New York, N. Y., a corporation of New York No Drawing. Application December 31, 1942, Serial No. 470,908

4 Claims. (Cl. 260—505)

This invention relates to a process for the manufacture of 2,6-dinitro-4-sulpho-toluene.

It is an object of this invention to provide a convenient and economical method, suitable for commercial use, for the preparation of 2,6-dinitro-4-sulpho-toluene from readily obtainable raw materials.

Another object is to provide an efficient and economical method for recovery of 2,6-dinitro-4-sulpho-toluene from the reaction mixture in which it is formed.

Other objects of the invention will be in part obvious and will appear in part hereinafter.

It was known prior to this invention, to prepare 2,6-dinitro-4-sulpho-toluene by sulfonating toluene with oleum, and then nitrating the resulting para-toluene sulphonic acid by addition of nitric acid (specific gravity 1.49 to 1.52) to the sulphonation reaction mixture, the product being recovered in the form of its barium salt. This process results in the formation of a large amount of isomeric 2,4-dinitro-6-sulpho-toluene, so that the yield of 2,6-dinitro-4-sulpho-toluene is relatively poor.

It has also been proposed to prepare 2,6-dinitro-4-sulpho-toluene by nitration of para-toluene-sulphonyl chloride with fuming nitric acid. However, as compared with para-toluene sulphonic acid, para-toluene-sulphonyl chloride is relatively expensive; fuming nitric acid is dangerous to handle; and when this method is applied on a commercial scale, the yield of the desired product is not adequate to compensate for these uneconomical factors. This method is therefore unsuitable for large-scale commercial production.

I have discovered that 2,6-dinitro-4-sulpho-toluene can be obtained conveniently and in high yields, and therefore more economically than has been possible hitherto on a commercial scale, by nitration of 2-nitro-4-sulpho-toluene with nitric acid in the presence of concentrated sulphuric acid at a nitration temperature between about 80° and about 100° C. 2-Nitro-4-sulpho-toluene is readily obtained by sulphonation of ortho-nitrotoluene with oleum, and ortho-nitrotoluene is readily available as a commercial intermediate.

I have also found that the nitration can be carried out by adding nitric acid, or a mixture thereof with concentrated sulphuric acid, directly to the reaction mixture obtained by sulphonating ortho-nitrotoluene, and heating the resulting mixture to the nitration temperature. Thus, it is unnecessary to isolate the intermediate 2-nitro-4-sulpho-toluene from the sulphonation mixture before nitration. This procedure is preferred, since it results in an improved yield, in a saving of raw materials, especially of sulphuric acid, and does not interfere with recovery of the product in substantially pure form. At the same time, it permits maximum operating economy with respect to time, labor, and use of equipment.

I have also discovered that 2,6-dinitro-4-sulpho-toluene can be readily recovered from the nitration reaction mixture, by precipitation in the form of its potassium salt. This can be accomplished, for instance, by salting the nitration reaction mixture, after dilution with water, with potassium chloride or by adding another water-soluble potassium compound capable of reacting with 2,6-dinitro-4-sulpho-toluene to form the potassium salt thereof (as for example, potassium hydroxide, potassium acetate, or potassium carbonate) and separating the resulting precipitate of the potassium salt of 2,6-dinitro-4-sulpho-toluene from the mother liquor.

In the practice of the present invention in accordance with one method of procedure, 2-nitro-4-sulpho-toluene is nitrated at the nitration temperature by the action of nitric acid in the presence of concentrated sulphuric acid. The nitric acid is preferably added in an amount corresponding to at least one and one-third mols of $HNO_3$ per mol of 2-nitro-4-sulpho-toluene. The nitric acid and the sulphuric acid are preferably of such strength and are employed in such proportions as to yield a spent acid, after completion of the nitration, containing sulphuric acid of at least 87% strength, i. e., the ratio of the weight of $H_2SO_4$ to the weight of $H_2O$ in the spent acid should be at least 87:13. If the amounts of nitric acid and sulphuric acid, originally present, are such that lower concentrations of sulphuric acid in the spent acid are produced, the yield of 2,6-dinitro-4-sulpho-toluene is appreciably decreased. If desired, oleum may be employed instead of concentrated sulphuric acid in preparing the nitration mixture.

The nitration temperature may range from about 80° to about 100° C., and is preferably 90° to 95° C. Temperatures materially about 100° C. result in excessive carbonization or oxidation, while at temperatures materially lower than 80° C. nitration is too slow in starting.

When the nitration is complete, the reaction mixture may be advantageously drowned in water, or in a mixture of ice and water. The solution may then be salted with potassium chloride, for instance, at about 60° C. Upon cooling the mixture to about 30° C. the potassium salt of 2,6-dinitro-4-sulpho-toluene is precipitated, and may be recovered by centrifuging, filtration, or the like. If desired, it may be washed with aqueous potassium chloride solution, and then dried.

In carrying out the process of the invention according to a preferred procedure, ortho-nitrotoluene is sulphonated by means of oleum (e. g., 26% oleum), preferably in an amount containing slightly more than the quantity of sulphur trioxide theoretically required for mono-sulphonation of the ortho-nitrotoluene. The sulphonation temperature may be between about 100° and about 150° C.; it is preferably 100° to 120° C., and especially about 110° C.

After the sulphonation, the reaction mixture is advantageously cooled to about 80° to 90° C.; concentrated nitric acid, or still better, a mixture of concentrated nitric and sulphuric acids (generally known as "mixed acid"), is added, preferably in sufficient amount to have present at least one and one-third mols of nitric acid per mol of ortho-nitrotoluene originally subjected to sulphonation; and nitration is carried out by maintaining the mixture at the nitration temperature. The mixed acid may contain, for example, 29 parts of $HNO_3$ and 57 to 66 parts of $H_2SO_4$ for each 100 parts by weight of mixed acid, the remainder being mainly water. The quantity and concentration of the nitric acid or mixed acid employed preferably should be such that the spent acid resulting upon completion of the nitration contains sulphuric acid of at least 87% strength, as indicated above. The resulting 2.6-dinitro-4-sulpho-toluene may be recovered from the reaction mixture in any suitable manner. Preferably it is recovered in the form of the potassium salt in the manner described above.

The invention will be illustrated by the following example wherein parts are by weight and temperatures are in degrees centigrade.

*Example.*—548 parts (4 mol parts) of ortho-nitro-toluene, having a boiling range of 222°±1°, are added in successive portions to 1335 parts of 26% oleum (containing 4.33 mol parts of $SO_3$) while agitating and cooling. The addition of the ortho-nitrotoluene is so regulated that the temperature of the mixture does not rise above 40°. The mixture is gradually heated, over a period of about 45 minutes, to a temperature of 110° and maintained at a temperature range from 107° to 112°, until no odor of unreacted ortho-nitrotoluene can be detected in the vapor of a hot aqueous solution consisting of a sample of the sulphonation mixture diluted with about 5 times its weight of water.

Upon completion of the sulphonation, the mixture is cooled to 85°, and 1170 parts of mixed acid containing 29 parts of $HNO_3$ and 57 parts of $H_2SO_4$ per 100 parts of the mixture (containing 5.4 mol parts of $HNO_3$) are slowly added to the agitated mixture with external cooling so that the temperature does not exceed 95°. The mixture is maintained at 90° to 95° for about two hours; then cooled to 75° to 80°, and poured into an agitated mixture of 4000 parts of water and 500 parts of ice.

The resulting solution is heated to 60°, and 800 parts of potassium chloride are added. The mixture is agitated for about 16 hours, and then allowed to cool to about 30°. The resulting precipitate, which contains the 2,6-dinitro-toluene-4-potassium sulphonate, is separated from the mother liquor by centrifuging. The solid material is reslurried with a solution of 600 parts of potassium chloride in 3000 parts of water for about 4 hours, and the solid material is again separated by centrifuging. A yield of 2,6-dinitro-toluene-4-potassium sulphonate of the order of about 85% of the theoretical quantity obtainable from the ortho-nitrotoluene originally sulphonated is thus obtained.

The product is relatively free of impurities, and can be employed without further purification as an intermediate in dyestuff manufacture. For instance, upon reduction with iron and acetic acid, it may be converted to 2,6-diamino-4-sulpho-toluene, which is suitable for use without further purification as an intermediate for the production of azo dyes.

Since variations and modifications can be made in the details of the foregoing example, the procedure described therein is to be interpreted as illustrative rather than in a limiting sense. For example, 2-nitro-4-sulpho-toluene may be separated from the sulphonation mixture prior to the nitration, or 2-nitro-4-sulpho-toluene obtained by monosulphonating ortho-nitrotoluene in other ways may be subjected to the nitration with or without separation from the sulphonation mixture, or 2-nitro-4-sulpho-toluene prepared by other methods may be used. Other variations within the scope of my invention will be obvious to those skilled in the art.

I claim:

1. A process for preparing 2,6-dinitro-4-sulpho-toluene, which comprises sulphonating ortho-nitro-toluene with oleum, adding concentrated nitric acid to the resulting reaction mixture and maintaining the temperature of the mixture between 80° and 100° C.

2. A process for preparing 2,6-dinitro-4-sulpho-toluene, which comprises sulphonating ortho-nitro-toluene with oleum, adding concentrated nitric acid to the resulting reaction mixture, maintaining the temperature of the mixture between 80° and 100° C., diluting the resulting nitration mixture with water, adding a water-soluble potassium compound capable of reacting with 2,6-dinitro-4-sulpho-toluene to form the potassium salt thereof, and separating the resulting potassium salt of 2,6-dinitro-4-sulpho-toluene from the mixture.

3. A process for preparing 2,6-dinitro-4-sulpho-toluene, which comprises sulphonating ortho-nitrotoluene with oleum to form 2-nitro-4-sulpho-toluene, adding concentrated nitric acid to the resulting reaction mixture in such amounts that the reaction mixture contains at least one and one-third mols of $HNO_3$ per mol of 2-nitro-4-sulpho-toluene, adding concentrated sulphuric acid to the reaction mixture, and maintaining the temperature at 90° to 95° C., the amount of sulphuric acid in the nitration mixture being such as to yield, in the final reaction mixture, a spent acid of which the sulphuric acid concentration is at least 87%.

4. A process for preparing 2,6-dinitro-4-sulpho-toluene, which comprises sulphonating ortho-nitrotoluene with oleum, adding concentrated nitric acid and concentrated sulphuric acid to the resulting reaction mixture and maintaining the temperature of the mixture between 80° and 100° C., the amounts of concentrated nitric acid and sulphuric acid added to the reaction mixture being sufficient to yield, in the final reaction mixture, a spent acid of which the sulphuric acid concentration is at least 87%.

MICHAEL WITTE.